3,351,475
GLASS COMPOSITIONS, RESISTANT TO DISCOLORATION METHODS OF MAKING SAME AND ARTICLES PRODUCED THEREFROM
Erwin C. Hagedorn, Oregon, and Dallas P. Hall, Toledo, Ohio, assignors to Owens-Illinois, Inc., a corporation of Ohio
No Drawing. Filed Dec. 16, 1963, Ser. No. 330,631
6 Claims. (Cl. 106—52)

ABSTRACT OF THE DISCLOSURE

A method for making silicate glass compositions which undergo a specific desired transition in color upon exposure of the glass to sterilizing radiation thereby indicating to the observer that the glass has been subjected to radiation. The silicate base glass compositions have added thereto $MnO_2$ and CoO.

---

The present invention relates to glass compositions resistant to undesirable discoloration caused by exposure to radiation and which will undergo a desirable color change thus indicating that the glass has been exposed to radiation.

The present invention also relates to methods of making the aforementioned glass compositions and articles produced therefrom.

Most glass compositions tend to undergo certain changes when subjected to radiation, which changes are manifested by a transition in color. Unfortunately, the result is often an undesirable brown discoloration, which is termed "browning." Glasses such as soda-lime and borosilicate glasses that are most commonly employed in the manufacture of containers for packaging various goods are susceptible to a considerable extent to such discoloration. Hence, it is important to modify such glass compositions to render them resistant to such undesirable discoloration so that the appearance of the package will not be deleteriously affected.

Many products are often desirably sterilized by exposure to radiation. Included are pharmaceutical preparations such as various drugs, medical preparations, serums, vaccines, pills and the like as well as articles such as bandages, hypodermic syringes, needles and associated products. Conveniently, exposure to sterilizing radiation can occur after these goods have been packaged in glass containers so as to insure that they will be in excellent condition when purchased by the consumer. Similarly, it is often desirable to sterilize food and related products by exposure to radiation after they have been packaged in glass containers.

Employing ordinary glass compositions such as soda-lime or borosilicate glasses for the fabrication of glass containers for packaging substances which are sterilized by exposure to radiation encounters serious disadvantages and drawbacks because of the undesirable browning or discoloration which these glasses experience.

A number of ingredients have been employed in the past in glass compositions in order to alleviate or reduce the tendency of these glasses to discolor. Among these additives is cerium dioxide which is commonly incorporated in glass compositions so as to prevent discoloration upon exposure to radiation. However, the prior known methods and compositions for producing glasses which are resistant to this discoloration have been characterized by a number of disadvantages.

A further desirable property for glass compositions is the ability to undergo a specific color change upon exposure to radiation, thus indicating that the receptacle and its contents have been exposed to radiation, but not detract from the appearance. Particularly advantageous for manufacturers utilizing color coding as an identification aid, the transition from one color to another will enable separation of those containers which have been subjected to sterilization operations from those containers and receptacles which have not been sterilized. Thus, it is desirable to obtain a glass composition which is resistant to discoloration and yet which will undergo a specific color change which is easily recognized and provide a ready indication that the container and its contents have been sterilized. At the same time the container must maintain its good appearance and avoid unsightly browning in order to be acceptable to the purchasing public.

Accordingly, it is the object of this invention to produce a desirable color change in glass compositions upon exposure to radiation thus indicating that the glass has been exposed to radiation treatment and at the same time resist the tendency of the glass to undergo an undesirable browning discoloration.

It is a further object of the present invention to provide glass containers suitable for packaging a wide variety of goods that are subjected to sterilization radiation and which are resistant to undesirable discoloration upon exposure to radiation and which will undergo a favorable color change indicating that the container and the contents thereof have been subjected to sterilizing radiation.

In attaining the above objects, one feature of the present invention resides in modifying the properties of the base glass composition so that upon being exposed to sterilizing radiation, the glass will undergo a desirable transition in color thus indicating to the observer that the glass has been so treated.

The modification is achieved by incorporating into the base glass composition a sufficient amount of manganese dioxide, $MnO_2$. Generally, the proportions of the additive can vary over a considerable range of from about 0.25% to about 0.60% by weight based on the weight of the base glass composition.

Another feature of the present invention resides in the glass containers produced from the modified glass compositions, and which are particularly suitable for packaging foods that are subjected to sterilizing radiation. The glass containers before radiation display a color varying from salmon flint to salmon pink, which after the sterilizing radiation treatment exhibit a pale or light purple and do not undergo the undesirable browning discoloration which the same glasses, in the absence of the $MnO_2$, would clearly show.

Other objects, features and advantages of the present invention will become apparent from the following detailed description thereof.

According to the present invention ordinary glass compositions such as soda-lime glasses and borosilicate glasses can be rendered resistant to undesirable browning discoloration by the presence of a particular amount of $MnO_2$. The resulting glass is characterized by the ability to undergo a specific color change upon exposure to radiation and thus produce glass compositions that indicate to the observer that the glasses have been exposed to radiation.

In carrying out the invention, the manganese dioxide is added to the base glass compositions containing the usual ingredients such as $SiO_2$, $Na_2O$, $Fe_2O_3$ and the like. Thereafter, the glass can be used to form suitable containers, receptacles and other articles.

The quantity of the maganese dioxide added to the base glass compositions can vary and it has been found that a minimum of about 0.25% by weight of $MnO_2$ is particularly effective in producing the glass compositions which have excellent properties. As much as about 0.60% by weight of $MnO_2$ may be added, without unduly affecting the color.

All the aforementioned percentages by weight are based on the weight of the base glass composition.

Another embodiment of the present invention resides in having present in the glass compositions an additional modifying ingredient, supplementing the manganese dioxide, to obtain another glass composition that undergoes a desirable transition in color upon being exposed to sterilizing radiation and which avoides the unsightly browning discoloration of ordinary, unmodified glass compositions. The additional ingredient is cobalt oxide, CoO, which is added to the glass composition together with the manganese dioxide to produce a melt that is amethyst in color. In general about 0.002% by weight of CoO is required to enhance the quality of the glass. This embodiment of the invention is further described in the examples hereinafter.

Base glass compositions of numerous types are suitable for purposes of the present invention. As most containers for commercial packaging purposes are made from borosilicate glasses or soda-lime glass, the present invention is particularly applicable to these glasses. The presence of the $MnO_2$ in the designated amounts modifies the properties of the base glass in a valuable way so as to exhibit a desirable change in color after being subjected to sterilizing radiation. Because of these characteristics, the glasses produced according to the present invention can be employed for making containers and receptacles to be used in the pharmaceutical and food industries where it is desirable to subject the containers to sterilizing radiation treatment.

Illustrative of the radiation that can be employed in sterilization operations are X-rays and gamma rays, although other types of radiation can also be used. The radiation used as well as the intensity and dosage thereof will vary over a considerable range and are factors that are known in the pharmaceutical and other industries.

The following examples will serve to illustrate the present invention but are not considered limiting in any way.

EXAMPLE I

The example illustrates the undesirable discoloration that results when ordinary glass is exposed to radiation. A borosilicate base glass composition was employed containing the following ingredients by weight:

| | |
|---|---|
| $SiO_2$ | 74.60 |
| $B_3O_3$ | 9.50 |
| $Al_2O_3$ | 5.50 |
| $Na_2O$ | 6.60 |
| $K_2O$ | 0.60 |
| CaO | 0.90 |
| BaO | 2.20 |
| $Fe_2O_3$ | 0.05 |
| Cl | 0.20 |
| F | 0.10 |

A sample of the above glass was subjected to X-ray exposure of about $12 \times 10^6$ roentgens. A definite deep browning of the glass sample was observed which was unsatisfactory.

EXAMPLE II

*Base glass composition*

| | |
|---|---|
| $SiO_2$ | 74.60 |
| $B_2O_3$ | 9.50 |
| $Al_2O_3$ | 5.50 |
| $Na_2O$ | 6.60 |
| $K_2O$ | 0.60 |
| CaO | 0.90 |
| BaO | 2.20 |
| $Fe_2O_3$ | 0.05 |
| Cl | 0.20 |
| F | 0.10 |

To a base glass composition of the above formulation was added 0.25% by weight of $MnO_2$. The glass was melted and the resulting color of the glass was salmon flint. A sample of this glass was taken and subjected to X-ray exposure of $12 \times 10^6$ roentgens. The resulting color of the glass was light-purple and exhibited no browning effect.

EXAMPLE III

Employing the identical base glass composition as described in Example II, a melt was made by adding 0.50% by weight of $MnO_2$. The resulting melt had salmon-pink color. A sample of this glass was taken and exposed to X-ray exposure at $12 \times 10^6$ roentgens. The color of the glass resulting from exposure to radiation was light purple, and exhibited no browning effect.

EXAMPLE IV

This example illustrates the embodiment of the present invention wherein cobalt oxide, CoO, is added to the base glass composition. A standard soda-lime silica glass containing the following ingredients was employed.

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 |

A melt containing the above ingredients was prepared. To it were added 0.57% by weight of $MnO_2$ and 0.002% by weight of CoO. The color of the resulting melt was amethyst. A sample of this glass was exposed to X-ray radiation of $12 \times 10^6$ roentgens and exhibited a light purple color with no sign of browning discoloration.

The above examples illustrate that the glass compositions of the present invention undergo a specific color change when exposed to radiation thereby giving the observer an indication that the glasses have been exposed to radiation and in addition are free of undesirable discoloration brought about by exposure to radiation. These properties make the glass compositions of the present invention particularly suitable for the fabrication of glass containers for packaging a wide variety of goods including food and pharmaceutical goods which are sterilized by radiation.

What is claimed is:

1. In a method for making silicate glass compositions which normally tend to discolor upon exposure to sterilizing radiation, the improvement whereby the glass compositions resist browning discoloration and undergo a specific desired transition in color upon exposure of the glass compositions to radiation thereby indicating to the observer that the glass has been subjected to radiation, which improvement comprises modifying the base glass composition by having present in the glass composition from about 0.25% to about 0.60% by weight of $MnO_2$ and about 0.002% by weight of CoO.

2. In the method for making glass compositions as defined in claim 1 wherein the amount of $MnO_2$ is 0.57% by weight, the amount of CoO is 0.002% by weight and the base glass contains the following ingredients:

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 |

3. In a method for making silicate glass containers which normally tend to discolor upon exposure to sterilizing radiation the improvement whereby the containers resist undesirable browning discoloration and undergo a specific desired transition in color upon exposure of the containers to radiation thereby indicating to the observer that the containers have been sterilized by radiation which improvement comprises adding to the base glass from about 0.25% to about 0.60% by weight of $MnO_2$ and about 0.002% by weight of CoO.

4. In a method for making glass containers as defined in claim 3 wherein the base glass composition contains the following ingredients:

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 | and the $MnO_2$ is added thereto in the amount of 0.57% by weight.

5. A glass composition resistant to undesirable browning discoloration and capable of undergoing a specific color change upon exposure to sterilizing radiation and which comprises a base glass composition of the following formulation in percent by weight:

| | |
|---|---|
| $SiO_2$ | 73.37 |
| $Al_2O_3$ | 1.20 |
| CaO | 6.80 |
| MgO | 4.80 |
| $Na_2O$ | 13.60 |
| $K_2O$ | 0.20 |
| $Fe_2O_3$ | 0.03 | to which has been added from about 0.25% to about 0.60% by weight of $MnO_2$ and 0.002% by weight of CoO.

6. An article made from the glass composition as defined in claim 5.

References Cited
UNITED STATES PATENTS

| | | | |
|---|---|---|---|
| 2,219,122 | 10/1940 | Weidert et al. | 106—52 |
| 2,752,506 | 6/1956 | Fitzgerald et al. | 106—52 |
| 2,782,319 | 2/1957 | McAlpine et al. | 106—52 |
| 3,046,400 | 7/1962 | Paymal | 106—52 |
| 3,173,850 | 3/1965 | Hood | 106—52 |

HELEN M. McCARTHY, *Primary Examiner.*